Nov. 20, 1962 J. V. FREDD Re. 25,289

WELL TOOLS

Original Filed Nov. 19, 1954 2 Sheets-Sheet 1

INVENTOR.
John V. Fredd
BY
Rogers Ashley
ATTORNEY

Nov. 20, 1962 J. V. FREDD Re. 25,289

WELL TOOLS

Original Filed Nov. 19, 1954 2 Sheets-Sheet 2

INVENTOR.
John V. Fredd
BY
Hastings Ashley
ATTORNEY

United States Patent Office

Re. 25,289
Reissued Nov. 20, 1962

25,289
WELL TOOLS

John V. Fredd, Dallas, Tex., assignor to Otis Engineering Corporation, Dallas, Tex., a corporation of Delaware Original No. 2,856,003, dated Oct. 14, 1958, Ser. No. 470,042, Nov. 19, 1954. Application for reissue June 2, 1960, Ser. No. 33,609
14 Claims. (Cl. 166—126)

Matter enclosed in heavy brackets [ ] appears in the original patent but forms no part of this reissue specification; matter printed in italics indicates the additions made by reissue.

This invention relates to well tools, and more particularly to a locking means for securing well tools in well tubing.

An object of the invention is to provide a new and improved locking means for securing well tools, such as well head plugs, in a desired position in well tubing.

Another object of the invention is to provide a locking means, of the type described, having an expansible means for engaging the well tubing to lock the well tool thereto and a locking member for holding the expansible means in expanded position.

Still another object of the invention is to provide a locking means of the type described, wherein the locking member cannot be moved to operative position to hold the expansible means in expanded position unless the expansible means is in fully expanded position.

A further object of the invention is to provide a locking means, of the type described, for a well plug having a longitudinal bore and a valve for closing said bore, the locking device being positioned by a running tool which holds the valve open until the expansible means is locked in fully expanded position.

A still further object of the invention is to provide a new and improved well plug for closing a well tubing which may be locked in a landing nipple of a particular configuration by an expansible means which expands to fully expanded position when disposed in the landing nipple, the expansible means being lockable in said expanded position by a locking member which cannot be moved to locking position until the expansible means is in fully expanded position.

Another object of the invention is to provide a well plug, of the type described, having a packing means for sealing between the well tubing and the plug, and a longitudinal bore closable by a valve, said valve being held open during the insertion and removal of the well plug whereby the fluid pressure differentials acting across the plug may be equalized.

Additional objects and advantages of the invention will be readily apparent from the reading of the following description of devices constructed in accordance with the invention, and reference to the accompanying drawings thereof, wherein.

Figure 1:
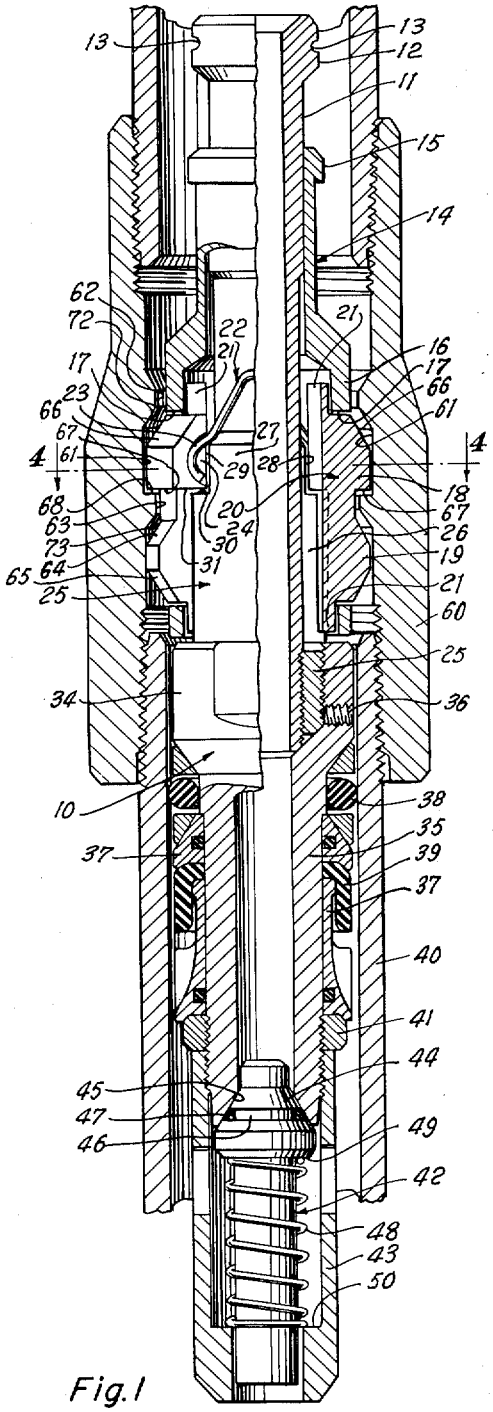
FIGURE 1 is a view, partly in elevation and partly in section, of the well plug showing the same locked in position in a landing nipple of a well tubing.

Referring now particularly to FIGURE 1, the numeral 10 designates generally a well plug which includes a carrier mandrel 11 provided at its upper end with a flange 12 having tangential grooves 13 for receiving shear pins whereby the carrier mandrel may be detachably secured to a suitable running tool (not shown). A tubular key or locking member carrier 14 is slidably mounted on the carrier mandrel intermediate the ends thereof and is provided on its upper end with an external annular undercut flange 15 whereby it may be engaged by a suitable pulling tool.

The key carrier 14 has an enlarged lower portion 16 provided with opposed apertures or windows 17 through which the bosses 18 and 19 of the expansible keys 20 extend. The keys 20 are substantially T-shaped and are provided with upper and lower extensions 21 which are adapted to engage the internal surfaces of the key carrier to limit outward movement of the keys relative to the carrier mandrel. The keys are yieldably urged toward expanded positions by springs 22 whose curved outer ends 23 are seated in recesses 24 of suitable configuration provided in the sides of the keys.

Figure 5:
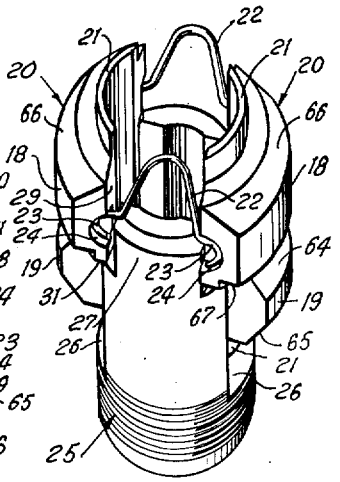
FIGURE 5 is a perspective view of the expansible means and keys and the locking member associated therewith of the well plug of FIGURE 1 showing the expansible keys locked in expanded positions.

A lock sleeve or member 25 is threaded on the lower end of the carrier mandrel and is provided with opposed upwardly opening slots 26 which receive the narrow lower boss 19 portions of the T-shaped locking keys. The slots are enlarged at the upper end of the lock sleeve to provide locking extensions 27 having opposed locking surfaces 28 which are adapted to extend between the keys 20 when the lock sleeve is in its upper locking position shown in FIGURES 1 and 5, wherein the locking surfaces 28 of the locking extensions engage the inner lock surfaces 29 of the locking keys to prevent inward movement of the keys toward retracted position. The lock sleeve is also provided with upwardly facing stop shoulders 30 at the lower ends of the locking surfaces 28, and these stop shoulders are adapted to engage the downwardly facing stop shoulders 31 on the under side of the arms of the upper cross portion of the T-shaped locking keys to limit upward movement of the lock sleeve with respect to the locking keys.

A packer mandrel 35 is threaded on the lower end of the lock sleeve and is rigidly secured thereto by a set screw 36. A packer assembly 37 is disposed on the packer mandrel and includes an O-ring 38 and a downwardly facing packer cup 39 which seal between the packer mandrel and the well tubing 40. The packer assembly is retained on the packer mandrel by a nut 41 threaded on the lower end of the packer mandrel and upward movement of the packer assembly is limited by engagement of the packer assembly with the enlarged upper portion 34 of the packer mandrel.

The carrier mandrel and the packer mandrel have aligned longitudinal bores which are closable by a valve 42 mounted in a valve cage 43 threaded on the lower end of the packer mandrel. The valve has a frustoconical ground seating surface or head 44 which engages the beveled surface or valve seat 45 at the lower end of the packer mandrel to plug the bore of the packer mandrel. A groove 46 in the valve seating surface receives an O-ring 47 which provides further sealing between the valve and the valve seat. This valve is biased upwardly toward closed position by a spring 48 disposed about the valve and whose opposite ends bear against a downwardly facing shoulder 49 below the head of the valve and the upwardly facing shoulder 50 in the lower end of the bore of the valve cage.

The well tubing 40 includes or has connected therein a landing nipple 60 having an internal annular groove 61, defined by internal flanges 62 and 63, of corresponding configuration to the upper bosses 18 of the keys 20. The upper and lower surfaces 64 and 65 of the lower bosses 19 of the upper surface 66 of the upper bosses 18 of the keys are beveled, whereby the keys are cammed inwardly upon meeting internal obstructions in the well tubing in passing therethrough. Abrupt downwardly facing stop shoulders 67 at the lower end of the upper bosses 18 of the keys extend substantially perpendicularly with respect to the longitudinal axis of the well tool and of the well tubing, whereby when the keys reach a landing nipple 40 having the appropriate internal configuration the keys expand to the positions shown in FIGURE 1, wherein the stop shoulders 67 engage the annular upwardly facing stop shoulder 68 and thus limit downward movement of the plug in the well tubing.

In use, the well plug 10 is lowered into the well tubing by means of a suitable running tool, having an annular skirt which telescopes over flange 12 on the upper end of the carrier mandrel and which is detachably secured to the carrier mandrel by shear pins which are received in the grooves 13 in the upper end of said flange. The running tool has a prong which extends downwardly through the carrier mandrel and the packer mandrel to engage the upper end of the valve and hold it in lowered open position against the upward force exerted by the valve spring 48. With the valve 42 open, the plug may be moved downwardly in the well tubing even though liquids are present in said well tubing.

The well plug is moved downwardly in the well tubing with the keys moving inwardly upon meeting obstructions until a landing nipple 60 of the appropriate internal configuration is reached, whereupon the locking keys 20 move to fully expanded position and the engagement of the stop shoulders 67 of the upper bosses of the keys and the stop shoulder 68 of the landing nipple prevents further downward movement of the well plug.

The carrier mandrel is then pulled upwardly to move the upward extensions 27 of the lock sleeve between the keys to lock the keys in their expanded position, the engagement between the upwardly facing beveled shoulders 64 and 66 of the keys and the downwardly facing beveled shoulders 72 and 73 of the landing nipple tending to hold the keys stationary during this upward movement of the carrier mandrel. The width of the upward extensions of the lock sleeve is such that they cannot be moved upwardly between the keys unless the latter are expanded to the maximum limit in the landing nipple, so that the plug is positively locked in the mandrel before the valve is closed to create a pressure differential across the plug. This feature is of great importance in safeguarding human lives and well equipment since the great pressure differentials found in the wells could unseat the plug and move it upwardly with great force if the locking keys are not in fully expanded position when the valve 42 is closed.

The running tool is then moved upwardly with respect to the carrier mandrel, the shear pins which connect the running tool to the carrier mandrel shearing. Simultaneously, the prong of the running tool moves upwardly permitting the valve 42 to close. The well plug is now locked in operative position in the well tubing. The running tool is then removed.

When it is desired to remove the well plug, a pulling tool, such as the one disclosed in the patent to H. C. Otis, 1,898,261, is lowered into the well tubing. The pulling tool may be provided with a prong which enters the carrier mandrel and the packer mandrel to engage the upper end of the valve 42 to open the valve and thus equalize the pressure differential on the well plug. If desired, the pressure differential across the well plug could be reduced by introducing pressure to the bore of the tubing string above the well plug from an external source of fluid pressure. The pulling tool, once the pressure differential is removed, engages the upper end of the carrier mandrel and drives it downwardly, thus moving the upward extensions 27 of the lock sleeve downwardly out from between the locking keys and freeing the keys for inward movement toward retracted position. The pulling tool then engages the undercut flange 15 at the upper end of the key carrier and the latter is pulled upwardly. The locking keys move inwardly toward retracted position during this upward movement of the well plug due to the camming action between the upwardly facing beveled upper surfaces 64 and 66 of the keys and the downwardly facing beveled shoulders 72 and 73 of the landing nipple. The well plug is then pulled upwardly from the well tubing, the camming action of the beveled surfaces 64 and 66 moving the keys inwardly upon encountering obstructions in the well tubing.

It will be apparent that a new and improved locking means for well plugs and the like has been illustrated and described, which includes expansible locking keys which move into fully expanded position when positioned in a landing nipple of a suitable configuration, and a locking sleeve or member which is movable upwardly between the keys to lock them in their expanded position when the keys are in fully expanded position. It will also be apparent that a new and improved well plug has been illustrated and described which includes a valve which is closable only when the well plug is securely locked in position in the well tubing.

Figure 2:
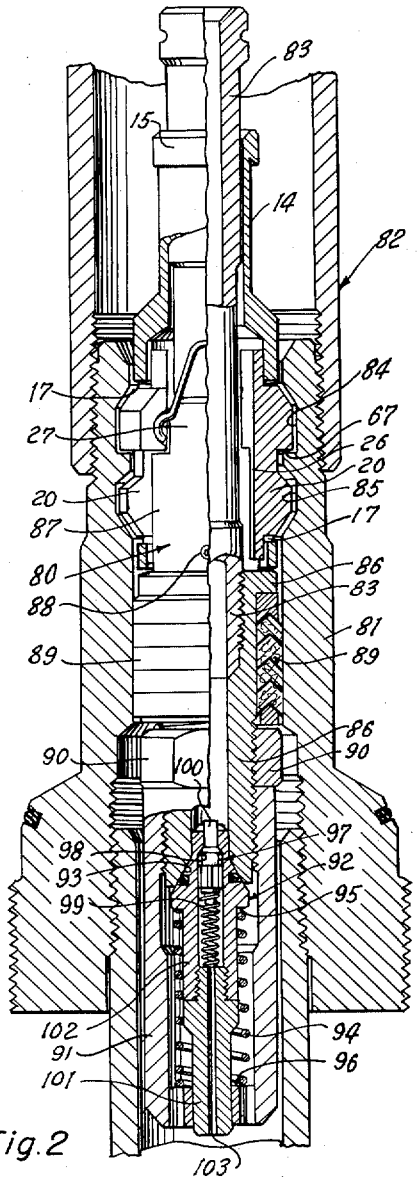
FIGURE 2 is a similar view of a modified form of the well plug shown in FIGURE 1.

In FIGURE 2 is illustrated a modified well plug 80 which is adapted to be locked in position in a landing nipple or adaptor 81 of a well tubing 82. The well plug includes a carrier mandrel 83 on which is slidably mounted the key carrier 14. The keys 20 extend through the windows 17 of the key carrier and are adapted to engage in the key recesses 84 and 85 of the adaptor 81. In this form of the well plug, the packer mandrel 86 is directly threaded to the lower end of the carrier mandrel and the lock sleeve arms 87 are integral with and project upwardly from the upper end of the packer mandrel and along the carrier mandrel. The arms 87 are rigidly secured to the carrier mandrel by a set screw 88. The lock sleeve arms define the same slots 26 and have the same upward extensions 27 as the lock mandrel 25 of FIGURE 1.

A packer assembly 89 of the chevron or V-type is held on the packer mandrel 86 by a nut 90 threaded thereon. A valve cage 91 is threaded on the lower end of the packer mandrel and has a main valve 92 mounted therein which seats against the beveled shoulder or seat 93 at the lower end of the packer mandrel. The main valve is biased upwardly toward closed position by a spring 94 whose opposite ends bear against the shoulders 95 and 96 of the main valve and the valve cage, respectively.

The main valve is provided with a secondary valve 97 which engages a valve seat 98 in the central bore of the main valve to close the latter. The secondary valve is biased toward closed position by a spring 99 in the bore of the main valve and is provided with an upward extension 100 which projects upwardly above the upper end of the main valve when the secondary valve is in closed position. The main valve 92 has a lower section 101 threaded in the upper section 102 to provide a seat for the spring 99. The upper and lower sections of the main valve have communicating bores which are closed against upward flow therethrough by the secondary valve 97.

The well plug 80 is used and operated in the same manner as the well plug 10 except that the secondary valve is first opened by the prong of the pulling tool before the main valve is opened preparatory to removal of the plug. The provision of the secondary valve, which closes a smaller orifice and can therefore be opened by a relatively small downward force, enables the well plug to be removed easily from wells wherein extremely high pressure differentials exist across the well plug.

Figure 3:
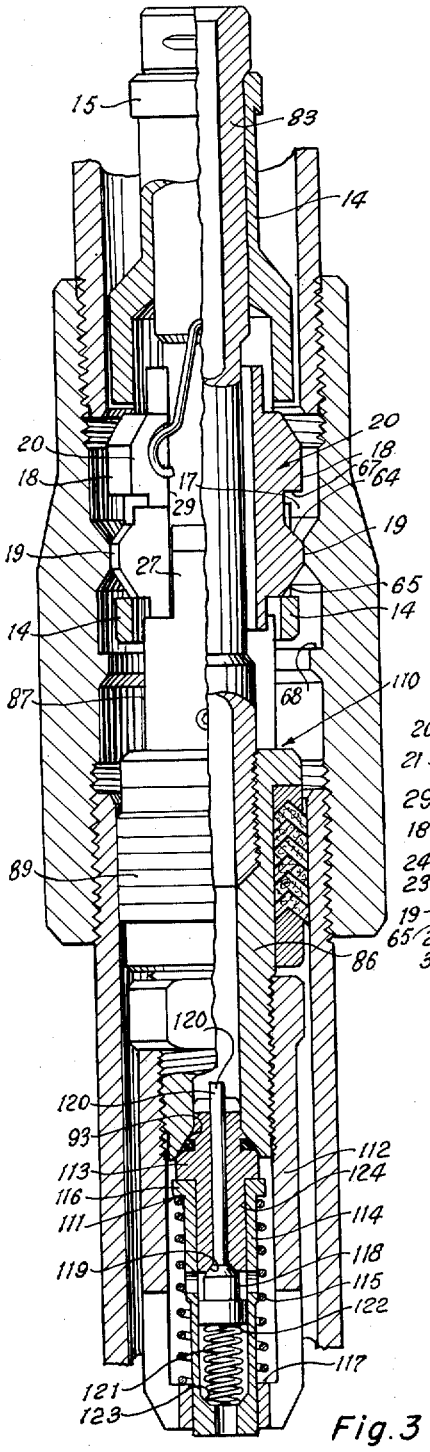
FIGURE 3 is a similar view of still another modified form of the well plug shown in FIGURE 1, showing the same being lowered into place in a well tubing.
Figure 4:
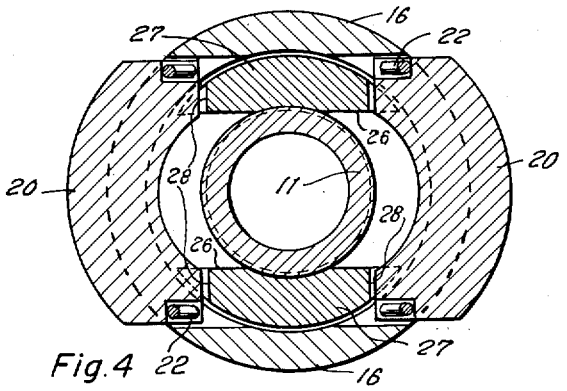
FIGURE 4 is a cross-sectional view taken on the line 4—4 of FIGURE 1.
Figure 6:
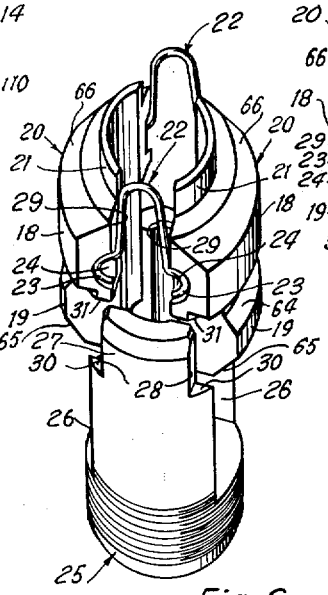
FIGURE 6 is a perspective view of the expansible keys and locking member of FIGURE 5 showing the expansible keys in retracted position.

The well plug 110 of FIGURE 3 differs from the well plug 80 of Figure 2 only in having a different form of valve for closing the bore of the packer mandrel 86. The main valve 111 is mounted in a valve cage 112 threaded on the lower end of the packer mandrel and includes an upper section 113 which sets against the valve seat 93 provided in the lower end of the packer mandrel. A lower sleeve section 114 is disposed about the lower reduced end 124 of the upper section 113 of the main valve and a spring 115 disposed about the lower sleeve section is confined between an upper external flange 116 of the sleeve section and a shoulder 117 of the valve cage to bias the main valve upwardly toward closed position.

An inner secondary valve 118 is disposed in the lower sleeve section and is adapted to engage a beveled seat 119 at the lower end of the upper section 113 to seal the bore thereof. An upward extension 120 on the secondary valve extends upwardly through the bore of the upper section of the main valve and projects above the upper end thereof when the secondary valve is in closed position. A spring 121 is confined between the lower end 122 of the secondary valve and a shoulder 123 of the lower sleeve section to bias the secondary valve toward closed position.

The landing nipple 60 and the adaptor 81 illustrated and described herein are shown to be in the form of well head fittings or tubing hangers for use in well-known types of well heads for supporting the string of tubing or flow conductor in the well bore.

It will readily be seen that new and improved well plugs have been illustrated and described, each of which includes a carrier mandrel, a key carrier provided with outwardly biased locking keys slidably mounted on the carrier mandrel, a lock sleeve rigidly secured to the carrier mandrel for locking the keys in fully expanded positions upon upward movement of the carrier mandrel relative to the keys, a packer mandrel secured to the carrier mandrel, and a valve for closing the longitudinal communicating bores of the carrier and packer mandrels, the valve being biased toward closed positions. It will also be apparent that in two forms of the well plug, the main valve is provided with a secondary valve also biased toward closed position and which is operable initially by a prong of a pulling tool to relieve the pressure differential across the well plug preparatory to its removal from the well.

Furthermore, it will be seen that, in all forms of the well plugs, the inner locking surfaces of the locking keys are so designed and proportioned with respect to the upper extensions of the lock sleeves or lock sleeve arms that said lock sleeves or arms cannot be moved upwardly to hold the locking keys in expanded position unless and until the keys are expanded to the maximum possible diameter within the recesses or grooves of the landing nipple. This provides for positive assurance that the well plug is properly locked in place in the landing nipple before the running tool is released therefrom and before pressure differential is applied across said well plug. Likewise, the locking mechanism cannot be released without first driving the carrier mandrel and lock sleeve downwardly, thus precluding the possibility of unlocking the well plug if any appreciable pressure differential exists across the packing of said well plug.

It is believed obvious that the carrier mandrel may be composed of several separate parts suitably connected together to form a unit, for example, the mandrels 11 and 83, and the lock sleeve 25 and the packer mandrel 86 having the lock sleeve arms 87 thereon.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A well tool including: a well head fitting having a bore therethrough and having means for connecting it at its lower end to a well flow conductor, said fitting having an internal groove in its bore providing an upwardly facing stop shoulder and a downwardly facing lock shoulder in said bore; a carrier mandrel; locking means slidably mounted on said carrier mandrel and movable longitudinally thereon; said locking means, having a downwardly facing stop shoulder thereon and an upwardly facing lock shoulder, said locking means being movable laterally of said carrier mandrel between retracted and expanded positions; means biasing said locking means outwardly toward expanded positions; said locking means being free to move toward fully expanded position at all times and adapted to enter the groove in said fitting whereby the stop shoulder on said locking means engages the stop shoulder in the bore of the fitting to limit downward movement of the locking means therethrough and to position said locking means in alignment with said groove, whereby said means biasing said locking means outwardly may move said lock shoulder of said locking means to position to engage said lock shoulder in the bore of said fitting; and lock means on said carrier mandrel movable upwardly with said carrier mandrel into engagement with said locking means when said locking means is in fully expanded position to lock said locking means in expanded position upon such upward longitudinal movement of said carrier mandrel relative to said locking means.

2. A well [took] *tool* including: a well head fitting having a bore therethrough and having means for connecting it at its lower end to a well flow conductor, said fitting having an internal groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means being movable laterally of said carrier mandrel between retracted and expanded positions; means biasing said locking means outwardly toward expanded position; said locking means being free to move toward expanded position at all times and adapted to enter the groove in said fitting whereby the stop shoulder on said locking means engages the stop shoulder in the fitting to limit downward movement of the locking means therethrough, and to position said locking means in alignment with said groove whereby said means biasing said locking means outwardly may move said lock shoulder of said locking means to position to engage said lock shoulder of said fitting; lock means on said carrier mandrel movable upwardly with said carrier mandrel into engagement with said locking means when said locking means is in fully expanded position to lock said locking means in expanded position upon longitudinal upward movement of said carrier mandrel relative to said locking means; said carrier mandrel having means carrying a packing assembly below said locking means.

3. A well tool including: a well head fitting having a bore therethrough and having means for connecting it at its lower end to a well flow conductor, said fitting having an internal groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means being movable laterally of said carrier mandrel between retracted and expanded positions; means biasing said locking means outwardly toward expanded position; said locking means being free to move toward expanded position at all times and adapted to enter the groove in said fitting whereby the stop shoulder on said locking means engages the stop shoulder in the fitting to limit downward movement of the locking means therethrough, and to position said locking means in alignment with said groove whereby said means biasing said locking means outwardly may move said lock shoulder of said locking means to position to engage said lock shoulder of said fitting; lock means on said carrier mandrel movable upwardly with said carrier mandrel into engagement with said locking means when said locking means is in fully expanded position to lock said locking means in expanded position upon longitudinal upward movement of said carrier mandrel relative to said locking means; said carrier mandrel having means carrying a packing assembly below said locking means and disposed to engage and seal against the bore wall of the well flow conductor below said fitting.

4. A well tool including: a well head fitting having a bore therethrough and having means for connecting it at its lower end to a well flow conductor, said fitting having an internal groove in its bore providing an upwardly facing stop shoulder and a downwardly facing lock shoulder; a carrier mandrel; locking means slidably mounted on said carrier mandrel and movable longitudinally therein; said locking means having a downwardly facing stop shoulder thereon and an upwardly facing lock shoulder, said locking means being movable laterally of said carrier mandrel between retracted and expanded positions; means biasing said locking means outwardly toward expanded position; said locking means being free to move toward expanded position at all times and adapted to enter the groove in said fitting whereby the stop shoulder on said locking means engages the stop shoulder in the fitting to limit downward movement of the locking means therethrough, and to position said locking means in alignment with said groove whereby said means biasing said locking means outwardly may move said lock shoulder of said locking means to position to engage said lock shoulder of said fitting; lock means on said carrier mandrel movable [upwardly] *longitudinally* with said carrier mandrel into engagement with said locking means when said locking means is in fully expanded position to lock said locking means in expanded position upon longitudinal [upward] movement of said carrier mandrel relative to said locking means; said carrier mandrel having means carrying a packing assembly below said locking means and disposed to engage and seal against the bore wall of the well flow conductor below said fitting, said well tool having a bore therethrough from below said packing assembly to above the locking means.

5. A well tool including: a well head fitting having a bore therethrough and having means for connecting it at its lower end to a well flow conductor, said fitting having an internal groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means being movable laterally of said carrier mandrel between retracted and expanded positions; means biasing said locking means outwardly toward expanded position; said locking means being free to move toward expanded position at all times and adapted to enter the groove in said fitting whereby the stop shoulder on said locking means engages the stop shoulder in the fitting to limit downward movement of the locking means therethrough, and to position said locking means in alignment with said groove whereby said means biasing said locking means outwardly may move said lock shoulder of said locking means to position to engage said lock shoulder of said fitting; lock means on said carrier mandrel movable upwardly with said carrier mandrel into engagement with said locking means when said locking means is in fully expanded position to lock said locking means in expanded position upon longitudinal upward movement of said carrier mandrel relative to said locking means; said carrier mandrel having means carrying a packing assembly below said locking means and disposed to engage and seal against the bore wall of the well flow conductor below said fitting, said well tool having a bore therethrough from below said packing assembly to above the locking means; and an openable and closable valve means normally closing said bore.

6. A well tool including: a well head fitting having a bore therethrough and having means for connecting it at its lower end to a well flow conductor, said fitting having an internal annular groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means shoulders being movable laterally of said carrier mandrel between retracted and projected positions; means biasing said locking means outwardly toward projecting position, said locking means being free to move toward fully projected position at all times; said locking means being adapted to enter said fitting whereby the stop shoulder on said locking means engages the stop shoulder in the bore of said fitting to limit downward movement of said locking means therethrough and to position said locking means in alignment with said groove whereby said means biasing said locking means outwardly may move said lock shoulder of said locking means to projecting position for engaging said locking shoulder in said fitting; and lock means on said carrier mandrel movable upwardly with said carrier mandrel into position engaging said locking means to prevent retraction of said locking means from projecting position, whereby said well tool is locked in position in said well head fitting.

7. A well tool including: a well head fitting having a bore therethrough and having means for connecting it at its lower end to a well flow conductor, said fitting having an internal annular groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means shoulders being movable laterally of said carrier mandrel between retracted and [projected] *projecting* positions; means biasing said locking means outwardly toward projecting position, said locking means being free to move toward fully [projected] *projecting* position at all times; said locking means being adapted to enter into said fitting whereby the stop shoulder on said locking means engages the stop shoulder in the bore of said fitting to limit downward movement of said locking means therethrough and to position said locking means in alignment with said groove whereby said means biasing said locking means outwardly may move said lock shoulder of said locking means to projecting position for engaging said locking shoulder in said fitting; and lock means on said carrier mandrel movable [upwardly] *longitudinally* with said carrier mandrel into position engaging said locking means to prevent retraction of said locking means from projecting position, whereby said well tool is locked in position in said well head fitting; said carrier mandrel having means carrying a packing assembly below said locking means.

8. A well tool including: a well head fitting having a bore therethrough and having means for connecting it at its lower end to a well flow conductor, said fitting having an internal annular groove in its bore providing an upwardly facing stop shoulder and a downwardly facing lock shoulder in said bore; a carrier mandrel; locking means slidably mounted on said carrier mandrel and movable longitudinally thereon; said locking means having a downwardly facing stop shoulder thereon and an upwardly facing lock shoulder, said locking means shoulders being movable laterally of said carrier mandrel between retracted and projected positions; means biasing said locking means outwardly toward projecting position, said locking means being free to move toward fully projected position at all times; said locking means being adapted to enter said fitting whereby the stop shoulder on said locking means engages the stop shoulder in the bore of said fitting to limit downward movement of said locking means therethrough and to position said locking means in alignment with said groove whereby said means biasing said locking means outwardly may move said lock shoulder of said locking means to projecting position for engaging said locking shoulder in said fitting; and lock means on said carrier mandrel movable upwardly with said carrier mandrel into position engaging said locking means to prevent retraction of said locking means from projecting position, whereby said well tool is locked in position in said well head fitting; said carrier mandrel having means carrying a packing assembly below said locking means and disposed to engage and seal against the bore wall of the well conductor below said well head fitting, said carrier mandrel and means carrying said packing assembly having a bore therethrough from below said packing assembly to above said locking means.

9. A well tool including: a carrier mandrel, a pair of locking means disposed on opposite sides of said carrier mandrel and mounted on said carrier mandrel for longitudinal movement relative thereto, said locking means being movable outwardly of said carrier mandrel to expanded positions; means baising said locking means toward said expanded positions; said locking means being free to move toward fully expanded positions at all times; and lock means on said carrier mandrel movable to a position between said locking means only when said locking means are in fully expanded positions; said lock means when in such position being disposed to engage and lock said locking means in said expanded positions.

10. A well tool including: a carrier mandrel, a pair of locking means disposed on opposite sides of said carrier mandrel and mounted on said carrier mandrel for longitudinal movement relative thereto, said locking means being movable outwardly of said carrier mandrel to expanded positions; means biasing said locking means toward said expanded positions, said locking means being free to move toward fully expanded positions at all times; lock means on said carrier mandrel movable to a position between said locking means only when said locking means are in fully expanded positions; said lock means when in such position being disposed to engage and lock said locking means in said expanded positions upon upward movement of said carrier mandrel relative to said locking means; said carrier mandrel having a longitudinal bore; a valve for closing said bore; and means biasing said valve toward closed position.

11. A well tool including: a carrier mandrel having an upper neck section and a lower lock section; cage means slidable longitudinally on said neck section of said mandrel; a pair of laterally movable locking means carried by said cage means on opposite sides of said neck section of said mandrel and movable outwardly of said mandrel to expanded positions; means biasing said locking means toward expanded position; said locking means being free to move toward fully expanded positions at all times; and lock means on said mandrel disposed to engage said laterally movable locking means to hold said locking means in expanded position, said lock means being movable with said mandrel longitudinally upwardly of said cage means to a position engaging said locking means only when said locking means are fully expanded.

12. A well tool including: a carrier mandrel; locking means mounted on said carrier mandrel and movable laterally thereof between retracted and expanded positions; means biasing said locking means toward expanded positions; said locking means being free to move toward fully expanded positions at all times; and lock means mounted on said mandrel and disposed to engage said laterally movable locking means to hold said locking means in expanded position, said lock means and said locking means each having longitudinally disposed locking surfaces co-engageable to positively hold said locking means in expanded position and disengageable upon downward movement of said lock means longitudinally with respect to said locking means to permit said locking means to move to retracted position, said lock means being movable upwardly to a position wherein the co-engageable locking surfaces of said lock means and said locking means are engaged to hold said locking means in expanded position, such upward movement being possible only when said locking means is in fully expanded position.

*13. A well tool including: a carrier mandrel; locking means mounted on said carrier mandrel and movable laterally between retracted and expanded positions; said locking means having a stop shoulder thereon disposed in a plane substantially normal to the longitudinal axis of said carrier mandrel and adapted to engage a complementary shoulder in a well flow conductor to limit movement of said carrier mandrel longitudinally in one direction in said conductor, said locking means being free to move laterally toward fully expanded position at all times; resilient means biasing said locking means outwardly toward expanded position; and lock means on said mandrel and disposed to engage said laterally movable locking means to hold said locking means in expanded position; said lock means on said mandrel and said locking means each having longitudinally disposed locking surfaces coengageable to positively hold said locking means in expanded position and disengageable upon longitudinal movement of said lock means in one direction with respect to said locking means to permit said locking means to move to retracted position, said lock means being movable longitudinally in a direction opposite to said one direction to a position wherein the co-engageable locking surfaces of said lock means and said locking means are engaged to hold said locking means in expanded position, such longitudinal movement in said opposite direction being possible only when said locking means is in fully expanded position.*

*14. A well tool including: a well head fitting having a bore therethrough and having means for connecting it at its lower end to a well flow conductor, said fitting having an internal groove in its bore providing an upwardly facing stop shoulder and a downwardly facing lock shoulder in said bore; an elongate central mandrel; a carrier sleeve mounted externally of said mandrel, said sleeve and said mandrel being movable longitudinally relative to each other to permit longitudinal movement of said mandrel with respect to said carrier sleeve; locking means mounted on said carrier sleeve and movable therewith, said locking means being movable laterally of said carrier sleeve between retracted position and expanded position, said locking means having a downwardly facing stop shoulder thereon and an upwardly facing lock shoulder, said stop fitting and said lock shoulder being disposed to engage said upwardly facing stop shoulder of said well head fitting and said lock shoulder being disposed to engage said downwardly facing lock shoulder in said well head fitting; means biasing said locking means outwardly toward expanded position, said locking means being free to move toward expanded position at all times and adapted to enter the groove in said fitting whereby the stop shoulder on said locking means engages the stop shoulder in the fitting to limit downward movement of the locking means and carrier sleeve therethrough, and to position said locking means in alignment with said groove whereby said means biasing said locking means outwardly may move said lock shoulder of said locking means to position to engage said lock shoulder of said fitting; lock means on said mandrel movable longitudinally therewith with respect to said carrier sleeve into engagement with the said locking means when said locking means is in fully expanded position to lock said locking means in such expanded position upon such relative longitudinal movement of said mandrel with respect to said carrier sleeve and locking means; and a packing assembly below said locking means and disposed to*

*engage and seal against the bore wall of one of the well flow conductor and the fitting below said locking means to seal off flow upwardly through said fitting exteriorly of said mandrel.*

References Cited in the file of this patent or the original patent

UNITED STATES PATENTS

| | | |
|---|---|---|
| 2,139,983 | Stone | Dec. 13, 1938 |
| 2,392,244 | Hooser | Jan. 1, 1946 |
| 2,401,119 | Taylor | May 28, 1946 |
| 2,447,546 | Spencer | Aug. 24, 1948 |
| 2,605,843 | Baker | Aug. 5, 1952 |
| 2,673,614 | Miller | Mar. 30, 1954 |
| 2,681,112 | Lee | June 15, 1954 |
| 2,698,056 | Marshall et al. | Dec. 28, 1954 |